United States Patent [19]
Taimatsu et al.

[11] Patent Number: 6,123,898
[45] Date of Patent: Sep. 26, 2000

[54] LOW HEAT EXPANSION ALLOY

[75] Inventors: Hitoshi Taimatsu, Akita; Masami Ueda, Suita, both of Japan

[73] Assignee: Sumitomo Special Metals Co., Ltd., Osaka, Japan

[21] Appl. No.: 09/180,750

[22] PCT Filed: Mar. 17, 1998

[86] PCT No.: PCT/JP98/01121

§ 371 Date: May 25, 1999

§ 102(e) Date: May 25, 1999

[87] PCT Pub. No.: WO98/41665

PCT Pub. Date: Sep. 24, 1998

[30] Foreign Application Priority Data

Mar. 18, 1997 [JP] Japan ................................. 9-085901
Dec. 22, 1997 [JP] Japan ................................. 9-365678
Mar. 16, 1998 [JP] Japan ................................ 10-088044

[51] Int. Cl.[7] ............................ C22C 38/22; C22C 30/00
[52] U.S. Cl. ................................ 420/67; 420/67; 420/68; 420/583
[58] Field of Search ................................ 420/67, 68, 583

[56] References Cited

FOREIGN PATENT DOCUMENTS

| | | |
|---|---|---|
| 50-124821 | 10/1975 | Japan . |
| 53-147604 | 12/1978 | Japan . |
| 62-1841 | 1/1987 | Japan . |
| 62-287047 | 12/1987 | Japan . |
| 62-287049 | 12/1987 | Japan . |
| 1-123052 | 5/1989 | Japan . |

*Primary Examiner*—Deborah Yee
*Attorney, Agent, or Firm*—Dykema Gossett PLLC

[57] ABSTRACT

It is an objective of the present invention to provide low thermal expansion alloys having excellent high temperature mechanical properties, the oxidation resistance, and the electrical conductivity by modifying the basic Cr—W—Fe alloy in order to meet various industrial demands including prolonging the life of plant machinery being operated at high temperature and a scaling-up solid oxide fuel cell, so that the coefficient of thermal expansion can be approximated to those of stabilized zirconia. In order to achieve these objectives, Co is added to Cr—W—Fe system alloy possessing an excellent thermal matching characteristic to stabilized zirconia in order to enhance the high temperature mechanical properties without changing original properties of thermal matching, the oxidation resistance and the electrical conductivity. Cr and Al are added in order to further improve the oxidation resistance and to approximate the coefficient of surface thermal expansion to that of stabilized zirconia. Furthermore, by adding at least one element properly selected from the element group comprising of Ti, Zr, and Hf, the electrical resistance can be reduced; if Hf element is co-added with B element, the hot working characteristics can be especially improved. Any combination of Co, Al, and (Ti,Zr,Hf) can be appropriately chosen and added to the basic Cr—W—Fe system alloys. B element can be added in order to prevent the grain boundary segregation of W element. In order to improve a further resistance against the high temperature oxidation, one or more than two elements properly selected from the element group comprising of Y, Hf, Ce, La, Nd, and Dy can be added to the basic Cr—W—Fe system alloy.

5 Claims, No Drawings

LOW HEAT EXPANSION ALLOY

This application is a 371 of PCT/JP98/01121 filed Mar. 17, 1998.

DESCRIPTION

1. Technical Field

The present invention relates to an improvement of the low thermal expansion alloys composed of the basic Cr—W—Fe system alloy by which the coefficients of thermal expansion of said alloy are approximated to the coefficient of thermal expansion of stabilized zirconia. The present invention is furthermore aimed on several objectives. These objectives may include (1) an improvement of oxidation resistance by forming a surface oxide layer consisting of $Cr_2O_3$ containing $Al_2O_3$ on the extremely outer surface and an inner layer with dispersed $Al_2O_3$, (2) an enhancing mechanical properties by adding Co element, (3) a reducing specific resistance by adding at least one element properly selected from the element group consisted of Ti, Zr, and Hf, (4) an adding B element in order to prevent the grain boundary segregation of W element, and (5) an adding M element in order to improve the oxidation resistance; where said M element is appropriately selected one or more than two elements from the element group consisting of Y, Hf, Ce, La, Nd, and Dy. Then, by accomplishing the aforementioned objectives, the present invention directly relates to provide an alloy with low coefficient of thermal expansion, which is furthermore characterized by (a) a formation of an intermediate layer which serves as a thermal barrier coating and is formed between zirconia system ceramic and substrate material. The low thermal expansion alloy is, moreover, characterized by (b) a coefficient of thermal expansion which is approximated to the coefficient of thermal expansion of stabilized zirconia—which is a promising third generation ceramic material applicable as solid oxide fuel cell, and (c) some other excellent physical and mechanical properties including high-temperature strength, oxidation resistance and low specific resistance.

2. Background Art

Recently, there is a significant trend of more severe operational conditions of higher temperature and higher pressure in a lot of plant machinery being operated at high temperature regimes including a generator gas turbine, reflecting to saving energy and global environmental issues. As a result, metallic materials which have been used under the critical conditions are subjected to a severe extent of damage and deterioration processes.

Hence an anti-corrosion coating is normally applied to surfaces of static and dynamic blades made of high strength superalloys in gas turbines for both airplanes and on-ground applications. However, the anti-corrosion coating is not a perfect solution to solve the current damage and deterioration problem due to a high temperature corrosion.

By the thermal barrier coating (TBC) as an example, the ceramic material having a lower thermal conductivity is coated onto the metallic material with temperature gradient in order to prevent unwanted temperature rise on the metal surface layer. The thermal barrier coating has been applied to the fuel chamber in the gas turbine system for more than 10 years, and recently is applied to cooling blades, too. The test conducted on a real blade indicated that the thermal barrier effect was observed with a temperature ranging from 50° C. to 100° C.

The thermal barrier coating is consisted of mainly two parts; the first layer is a ceramic sprayed layer made of mainly $ZrO_2$ which is a solid-solution with a stabilizer such as MgO, $Y_2O_3$, CaO or the like, and has a heat conductivity of 0.005~0.006 (cal/cm.s.°C.), being much less than those values for $Al_2O_3$ (0.04~0.08) or $TiO_2$ (0.01~0.02). The second layer is an intermediate sprayed layer composed of Ni—Al system alloy, Ni—Cr system alloy or M—Cr—Al—Y system alloy (whereas M represents Fe, Ni, Co element or the like). The second intermediate layer is formed for a purpose of reducing the thermal expansion difference between said ceramic sprayed layer and alloy substrate, and of improving corrosion resistance. This intermediate layer can be fabricated as a multi-layer structure of the mixed layer of said metal and ceramic materials. As an alternative approach, the intermediate layer can be formed as a continuously gradient layer in terms of compositions, so that it can also perform as a functionally gradient structure.

On the other hand, the fuel cell which receives an attention as a new type of generating system has several types including phosphoric acid fuel cell (PAFC) using a phosphoric acid solution as an electrolyte, molten carbonate fuel cell (MCFC) using a potassium carbonate, lithium carbonate or the like as an electrolyte, and solid oxide fuel cell (SOFC) using a zirconia system ceramic as an electrolyte. Any one of these types possesses excellent uniqueness of generating technology by a direct converting from chemical energy of fuel material to electrical energy through electrochemical reactions.

Current situation based on an energy policy and global environmental concern requires a rapid development of a dispersed type electric source which can be built at any location being close to the demanding place and a fuel cell as a co-generating electric source. Moreover, a higher generated power of the dispersed type electric source expects much for the fuel cell.

By solid oxide fuel cell, a single cell is formed by sandwiching both sides of the electrolyte plates made of yttria stabilized zirconia (YSZ) with a fuel electrode (as an anode) and an air electrode (as a cathode). Solid oxide fuel cell is, furthermore, constructed as a form of a multi-layer structure of a plurality of said single cells through a separator in order to obtain a practical level of electrical power. $H_2$ and CO are supplied to a passage space between said separator and the fuel electrode (anode), and the air is introduced into the passage space formed between the separator and the air electrode (cathode), so that a generating system can be established by using reverse reaction of electrolysis of the water.

The development target of the high temperature gas turbine proposed in the so-called Moon-Light Plan aiming toward an Energy-Saving Issue promoted by the Japanese Ministry of International Trade and Industry (MITI) is to reach the final inlet gas temperature of 1,773K and to approach the 55% of the total generating power efficiency by a co-generating system which is combined with a steam turbine driven by the heat exhausted from the turbine.

The current level of the power generating efficiency of thermal power plants by operating steam turbines is about 40%. If this level of power generating efficiency is increased by 10%, it is estimated that the fuel of approximately 2.2 billion dollars (based on 140 Japanese Yen=1 US dollars) can be saved in Japan per a single year.

By a structure of the aforementioned thermal barrier coating (TBC), a presence of the sprayed layer of stabilized zirconia is the most important component. As described previously, Ni-based superalloys are utilized in order to approach the target of higher temperature and higher pressure operation conditions. If the Ni-based superalloy is used without any surface protective coating in the gas turbine atmosphere, a life more than one year can not be expected. Therefore, it is indispensable to have a protective coating on surface layers of the gas turbine blade materials.

However, since there is a large discrepancy in the coefficients of thermal expansion between stabilized zirconia ($10\sim12\times10^{-6}$/K) and Ni-based superalloys ($18\sim20\times10^{-6}$/K), the sprayed layer of stabilized zirconia tends to have cracks. This is one of the major technical drawbacks associated with the conventional type of coating.

On the contrary to the above, an intermediate layer can be sprayed in order to reduce the significant difference in the coefficients of thermal expansion, and said intermediate layer is consisted of Ni—Al system alloy, Ni—Cr system alloy, or M—Cr—Al—Y system alloy (whereas M represents Fe, Ni, Co element or the like), expecting an improved corrosion resistance, too. However, the coefficients of the thermal expansion of these intermediate layers are about $16\sim18\times10^{-6}$/K, which are still too high. Hence the problem of the thermal mismatching has not be solved yet.

Now moving to our attention to solid oxide fuel cell, a presence of the separator is the most important component here. The fuel cell is normally constructed with a multiple-layer planar structure in order to enhance the effective surface area of the electrode and to reduce the internal resistance.

Since several properties are required to the fuel cell separator, (La, alkaline earth metals)$CrO_3$ is normally selected as a separator material. The required properties are (1) a thermal expansion coefficient which should be ideally close to those values of the coefficient of thermal expansion of the air electrode, the fuel electrode or the solid electrolyte, (2) a high corrosion resistance, and (3) a high electrical conductivity.

A practical role of the separator is to separate the individual cells when building a multiple-layer structure, to shield the air from $H_2$ fuel, and to support electrolyte plates.

In order to support the electrolyte plates, the surface area of the electrolyte plate should be fabricated with a bigger size than the surface area of the fuel electrode and the air electrode, so that the multiple-layer formation with the separator can be easily achieved and the electrolyte plates can be easily supported. However, the separator is made of the ceramic material as mentioned previously, it has several technical problems; including (1) a relatively weak mechanical strength, (2) a poor formability, and (3) less ability to scale-up the structure.

Because the separator is needed to connect between the air electrode which is exposed to an oxidation atmosphere and the fuel electrode which is exposed to a reduction atmosphere at high temperatures, the separator material should possess high mechanical strengths in both oxidation and reduction atmospheres and a good electrical conductivity.

It has been proposed that $LaCr_{0.9}Mg_{0.1}O_3$, $CoCr_2O_4$, or Ni—Al alloy can be used as a separator material. However, it was found that a connection of these separators to the fuel electrode or the solid electrolyte is not easily achieved.

A powder refining method has not been established for preparing uniform raw powder which is used for fabricating (La, alkaline earth metals)$CrO_3$. Although refractory alloys including stainless steels or Inconel exhibit superior mechanical strengths to the aforementioned ceramic materials, solid electrolyte is subjected to a tensile stress at the cell operating temperature (which is about 1000° C. (=1,273K) due to a large coefficient of thermal expansion of the aforementioned metals. The values of electrical resistance of oxide films formed on these refractory alloys are relatively high; which is another technical disadvantage.

With metallic separator, there are problems, including a mismatching in coefficient of thermal expansion, and a growth of oxides formed on the refractory steels. In order to solve the thermal mismatching problem, there are several ideas proposed; including (1) employing a foamed structure of LnMnOx for a connector, or (2) approaching the coefficient of thermal expansion by manipulating chemical compositions of metals. Furthermore, for a countermeasure of the oxide film growth problem, a spraying of $LaCrO_3$ has been tried. However, none of these ideas appears to be satisfactory.

There has been great efforts in research and development in manufacturing the stabilized zirconia to which MgO, $Y_2O_3$, CaO or the like is mixed as a solid-solution type stabilizer. These activities are promoted because of unique properties of stabilized zirconia such as high mechanical strength and toughness, high melting point and heat resistance, and electrical characteristics. Stabilized zirconia has been employed in various sectors in industries such as a steel industry, a chemical industry, a battery manufacturing, spray materials, turbine, internal combustion engine, sensors, and many others' applications.

Except the case when zirconia used as a ceramic itself, in many applications the ceramic is used by connecting to the adjacent metallic materials. However, there has not been developed any satisfactory ceramics which have a close value of the coefficient of thermal expansion to those of metals and applicable in various industries.

The present inventors have previously proposed Cr—W—M—Fe system alloy and Cr—W—M—B—Fe system alloy which are designed and fabricated by adding an M element (where M represents one or more than two elements properly selected from the element group comprising of Y, Hf, Ce, La, Nd, and Dy) to the basic Cr—W—Fe system alloy or adding B element to the basic Cr—W—M—Fe system alloy (Japan Patent Application Laid-Open No. Tokkai Hei 8-277441; 1996).

It was found that these alloys exhibit a close value of coefficient of thermal expansion to those of stabilized zirconia and an excellent oxidation resistance at elevated temperatures.

Namely, the coefficients of thermal expansion of the aforementioned alloys are in a range of $12\sim13\times10^{-6}$/K, which are very close to the coefficient of thermal expansion of stabilized zirconia ($10\sim12\times10^{-6}$/K). Moreover, it was also found that the oxidation resistance of these alloys shows a superior property to those of conventional stainless steels. However, these newly proposed alloys are not perfectly satisfactory due to the ever-increasing demands on higher temperature and higher pressure operation conditions, requiring more oxidation resistance and a closer value of coefficient of thermal expansion to exhibit excellent thermal matching to stabilized zirconia.

Furthermore, since the aforementioned alloys have larger values of specific resistance than those of conductive ceramic, it is difficult to obtain an excellent electrical conductivity. Moreover, the mechanical strength of these alloys is not strong enough as to a structural material; In particular, the high temperature strength (about 1,273K) of these alloys is not satisfactory.

THE OBJECTIVES OF THE INVENTION

As a consequence, in order to overcome the problems associated with the conventional type of materials, it is, therefore, an objective of the present invention to provide an oxidation resisting low thermal expansion alloy which has a close value of coefficient of thermal expansion to that of stabilized zirconia and possesses excellent oxidation resistance and electrical properties in order to meet requirements for prolonging lives of various types of high temperature plant machinery including gas turbines and for scaling-up solid oxide fuel cell.

It is another objective of the present invention to provide a high strength low thermal expansion alloy which has a close value of coefficient of thermal expansion to that of stabilized zirconia and excellent high temperature strength.

It is a further objective of the present invention to provide a low thermal expansion alloy with a low specific resistance.

It is yet another objective of the present invention to provide a low thermal expansion alloy which is further characterized by combined properties of the aforementioned excellent oxidation resistance, high temperature strength, and low specific resistance.

DISCLOSURE OF INVENTION

Based on the contents described in our previous proposed idea (Japan Patent Application Laid-Open No. Tokkai Hei 8-277441; 1996), the present inventors have conducted various investigations; aiming to develop metallic materials which possess excellent thermal matching characteristics, an oxidation resistance, and an electrical conductivity as well. Our continuous and diligent efforts for the research have resulted in the fact that when Al element is added to the Cr—W—Fe system alloy, Al element is selectively oxidized due to a higher affinity to oxygen than Cr element does, so that an oxide layer being consisted of $Cr_2O_3$ with $Al_2O_3$ formed on surface layer of the metallic material and $Al_2O_3$ is dispersed inside the metal substrate due to internal oxidation, by controlling properly adding amounts of Cr and Al elements.

The oxide layer of $Cr_2O_3$ containing $Al_2O_3$ formed on the surface layer was found to exhibit better protective properties than $Cr_2O_3$ alone formed on metal surface as proposed in the previous application. Also it was found that the evidence of containing $Al_2O_3$ contributes in reducing oxidation rate. As a result, the oxidation resistance is enhanced. On the contrary, if the surface layer of the metal substrate is covered with $Al_2O_3$ only, the electrical resistance will increase, and the coefficient of thermal expansion will increase with increasing Al contents. Therefore, metallic material being added with only Al element can not be used as an intermediate layer between the thermal barrier coating and the substrate, nor a separator for solid oxide fuel cell with an electrolyte of stabilized zirconia.

After conducting research on interrelationships between Al addition and oxidation resistance, electrical conductivity, or thermal expansivity, then, the present inventors have found that adding Al element with a certain amount to the basic Cr—W—Fe system alloy forms $Cr_2O_3$ containing $Al_2O_3$ on the surface layer of the metallic material. Furthermore, it was found that the thus formed duplex oxide layer exhibits superior protectiveness and oxidation resistance to $Cr_2O_3$ alone formed on Cr—W—Fe system alloy. Moreover, since the oxide layer thickness can be thinner, so that the excellent electrical conductivity can be also obtained. The presence of internally dispersed $Al_2O_3$ makes the material's coefficient of thermal expansion further close to that of stabilized zirconia. Furthermore, the present inventors have completed the first invention that, in addition to the aforementioned improvement, adding B element to Cr—W—Al—Fe system alloy prevents the grain boundary segregation of W element and adding at least one element properly selected from the element group comprising of Y, Hf, Ce, La, Nd, and Dy to any one of the above described alloys enhances furthermore the oxidation resistance.

Based on our previous application (Japan Patent Application Laid-Open No. Tokkai Hei 8-277441; 1996), the present inventors have investigated to further develop new alloy systems which can show much better thermal matching characteristic, oxidation resistance and electrical conductivity, as well. Especially better mechanical properties at high temperature regimes were our primary goal. It was found that when Co element is added to Cr—W—Fe system alloy, the high temperature mechanical properties were improved with maintaining still excellent thermal matching characteristic, the oxidation resistance, and the electrical conductivity.

When a small amount of Al is added to Cr—W—Co—Fe system alloy, Al is selectively oxidized because Al element has a higher affinity to oxygen than Cr element does. Hence, by controlling properly adding amounts of Cr and Al elements, $Cr_2O_3$ containing $Al_2O_3$ will be formed on the surface layer of the metallic substrate and $Al_2O_3$ is internally formed and dispersed inside the metallic substrate, so that a further resistance against the high temperature oxidation is improved. Since the oxide layer thickness is also thinner, an excellent electrical conductivity can be achieved. It was also found that the presence of the internally dispersed $Al_2O_3$ oxide makes the metallic material's coefficient of thermal expansion further closer to that of stabilized zirconia.

Furthermore, the present inventors have observed that adding a small amount of B element to Cr—W—Co—Fe system alloy and Cr—W—Co—Al—Fe system alloy prevents the grain boundary segregation of W element. Addition to this, it was found that adding at least one element properly selected from the element group comprising of Y, Hf, Ce, La, Nd, and Dy to any one of the aforementioned alloy systems improves further resistance against the high temperature oxidation, resulting in the new second invention.

The present inventors have also conducted tests to develop new Cr—W—Fe alloy systems which possess a low specific resistance. It was found that adding at least one element properly selected from the element group comprising of Ti, Zr, and Hf reduces the specific resistance without deterioration of the original thermal matching characteristic and the oxidation resistance.

When a small amount of Al element is added to the above mentioned Cr—W—(Ti,Zr,Hf)—Fe system alloy, surface oxide layer of $Cr_2O_3$ containing $Al_2O_3$ is formed by appropriate controlling adding amounts of both Cr and Al elements, owing to the fact that Al—which has a higher affinity to oxygen than Cr does—is selectively oxidized. Thus formed surface duplex oxide layer exhibits a superior protectiveness to the surface oxide of $Cr_2O_3$ alone formed on Cr—W—Fe alloy and the oxide layer thickness is thinner, so that the excellent electrical conductivity can be achieved. By a presence of the internally dispersed $Al_2O_3$, the coefficient of thermal expansion at the surface layer area will be further closer to that of stabilized zirconia.

Moreover, when Co element is added to Cr—W—(Ti,Zr,Hf)—Fe system alloy or Cr—W—(Ti,Zr,Hf)—Al—Fe system alloy, it was found that the high temperature mechanical properties will be improved with maintaining original excellent thermal matching characteristic, the oxidation resistance, and the electrical conductivity as well.

Furthermore, when the present inventors added a small amount of B element to Cr—W—(Ti,Zr,Hf)—Fe system alloy, Cr—W—(Ti,Zr,Hf)—Al—Fe system alloy, Cr—W—(Ti,Zr,Hf)—Co—Fe system alloy, and Cr—W—(Ti,Zr,Hf)—Al—Co—Fe system alloy, it was found that the grain boundary segregation of W element is prevented. By adding at leat one element properly selected from the element group comprising of Y, Hf, Ce, La, Nd, and Dy to any one of the above mentioned alloys systems, further improvement of the oxidation resistance was recognized. If Hf element is added, the hot working characteristics is particularly further improved under the co-existence of B element, resulting in the third invention.

BEST MODE FOR CARRYING OUT THE INVENTION

The oxidation resisting low thermal expansion alloy, according to the present invention, is characterized by the fact that said alloy contains Cr 15~40 wt % (weight %), W 5~15 wt %, Al 0.1~1 wt %, and is balanced by Fe with unavoidable impurities.

The high strength low thermal expansion alloy, according to the present invention, is characterized by the fact that said alloy contains Cr 15~40 wt %, W 5~15 wt %, Co 1~10 wt %, and is balanced by Fe with unavoidable impurities.

Moreover, the low specific resistance low thermal expansion alloy, according to the present invention, is characterized by the evidence that said alloy contains Cr 15~40 wt %, W 5~15 wt %, at least one element properly selected from the element group comprising of Ti, Zr, and Hf with 0.1~5 wt % (if Hf is solely selected, it should be 1~5 wt %), and is balanced by Fe with unavoidable impurities.

To any one of aforementioned Cr—W—Fe alloy systems, the following alloying element(s) can be selected to make further characteristic alloy(s); including Al with 0.1~1 wt % in order to improve the oxidation resistance, Co with 1~10 wt % in order to enhance the mechanical strengths, at least one element properly selected from the element group comprising of Ti, Zr, and Hf with 0.1~5 wt % in order to reduce the specific resistance, B with 0.001~0.01 wt % in order to prevent the grain boundary segregation of W of these alloys, and M (M can be one or more than two elements properly selected from the element group comprising of Y, Hf, Ce, La, Nd, and Dy) with 0.01~1 wt % in order to further improve the oxidation resistance.

Namely, there are various systems of low thermal expansion alloys, as listed below. However, if the Hf element is chosen for reducing the specific resistance, it is not necessary to select Hf element from the M group in order to improve the oxidation resistance.

Cr—W—Al—Fe system alloy
Cr—W—Al—B—Fe system alloy
Cr—W—Al—M—Fe system alloy
Cr—W—Al—B-M—Fe system alloy
Cr—W—Co—Fe system alloy
Cr—W—Co—B—Fe system alloy
Cr—W—Co—M—Fe system alloy
Cr—W—Co—B-M—Fe system alloy
Cr—W—Co—Al—Fe system alloy
Cr—W—Co—Al—B—Fe system alloy
Cr—W—Co—Al—M—Fe system alloy
Cr—W—Co—Al—B—M—Fe system alloy
Cr—W—(Ti,Zr,Hf)—Fe system alloy
Cr—W—(Ti,Zr,Hf)—B—Fe system alloy
Cr—W—(Ti,Zr,Hf)—M—Fe system alloy
Cr—W—(Ti,Zr,Hf)—M—Fe system alloy
Cr—W—(Ti,Zr,Hf)—B—Fe system alloy
Cr—W—(Ti,Zr,Hf)—Al—B—Fe system alloy
Cr—W—(Ti,Zr,Hf)—Al—M—Fe system alloy
Cr—W—(Ti,Zr,Hf)—Al—B—Fe system alloy
Cr—W—(Ti,Zr,Hf)—Co—B—Fe system alloy
Cr—W—(Ti,Zr,Hf)—Co—M—Fe system alloy
Cr—W—(Ti,Zr,Hf)—Co—M—Fe system alloy
Cr—W—(Ti,Zr,Hf)—Co—B—Fe system alloy
Cr—W—(Ti,Zr,Hf)—Al—Co—B—Fe system alloy
Cr—W—(Ti,Zr,Hf)—Al—Co—B—M—Fe system alloy
Cr—W—(Ti,Zr,Hf)—Al—Co—M—Fe system alloy
Cr—W—(Ti,Zr,Hf)—Al—Co—B—M—Fe system alloy In the followings, the containing limitations for each alloying element will be explained in details.

Cr is a basic alloying element in order to obtain the certain level of the heat resistance. Hence, it is necessary to contain at least 15 wt %. However, if it exceeds 40 wt %, the alloying effect will be saturated, rather the coefficient of thermal expansion will increase and the formability will be deteriorated. Consequently, it should be in a range from 15 to 40 wt %; more preferably it should be 15~25 wt %.

W is a basic alloying element in order to obtain a certain level of the coefficient of thermal expansion, so that it is necessary to contain at least 5 wt %. On the contrary, if it exceeds 15 wt %, the coefficient of thermal expansion will increase, which is not favorable. As a result, it should be in a range from 5 to 15 wt %; more preferably, it should be 5~10 wt %.

Co is a basic alloying element when high temperature strength is required. Therefore, it should be contained at least 1 wt %. On the other hand, if it exceeds 10 wt %, the hot working characteristics will be deteriorated and the coefficient of thermal expansion will increase. Hence, it should be in a range of 1~10 wt %; more preferably it should be in a range from 5 to 10 wt %.

Al exhibits a significant alloying element to alloy systems of the present invention. Al can promote to form a surface oxide layer of $Cr_2O_3$ containing $Al_2O_3$ and an internally dispersed $Al_2O_3$; the former type of external surface oxide layer will enhance the oxidation resistance and the latter type of internal oxides will make the material's coefficient of thermal expansion further closer to that of stabilized zirconia. If Al content is less than 0.1 wt %, internally dispersed $Al_2O_3$ oxides can not be formed. On the contrary, if it exceeds 1 wt %, the electrical conductivity will reduce and the coefficient of thermal expansion will increase. Therefore, it should be in a range from 0.1 to 1 wt %.

At least one element properly selected from the element group comprising of Ti, Zr, and Hf has an effect to reduce the electrical resistance. If it is less than 0.1 wt %, it can not show the efficiency; on the other hand, if it exceeds more than 5 wt %, its effect will be saturated. Moreover, if Hf element is solely chosen, Hf with less than 1 wt % will not exhibit its effect to reduce the electrical resistance. On the other hand, if it exceeds more than 5 wt %, its effect will be saturated. Hence, it should be 0.1 (if Hf is selected, it should be 1 wt %)~5 wt %; more preferably it should be 0.5~2 wt %. For the Hf alone, it should be a range from 1 to 2 wt %.

B is very effective to prevent the grain boundary segregation of W, so that it should contain at least 0.001 wt %. However, if it exceeds 0.01 wt %, its effect will be saturated. Consequently, it should be 0.001~0.01 wt %. For the case when Hf contains more than 1 wt %, it will be very effective for the hot working characteristics under a co-existence with the B element.

Any one or more than two elements properly selected from the element group comprising of Y, Hf, Ce, La, Nd, and Dy will enhance the oxidation resistance. Hence it should contain at least 0.01 wt %. If it exceeds 1 wt %, the hot working characteristics will be rapidly deteriorated. As a result, it is recommended to add with a range from 0.01 to 1 wt %.

Although the low thermal expansion alloy according to the present invention is characterized by the fact that at least one element properly selected from the element group comprising of Ti, Zr, and Hf is added to the Cr—W—Co—Fe system alloys in order to reduce the electrical resistance, at least one element should be properly chosen and added out of the element group comprising of Y, Hf, Ce, La, Nd, and Dy in order to add the improvement effect for the oxidation resistance to the Cr—W—Co—(Ti,Zr)—Fe system alloy. Although the lower electrical resistance and higher oxidation resistance can be achieved by adding Hf to the Cr—W—Co—(Hf)—Fe system alloy, at least one element properly selected from the element group comprising of Y, Ce, La, Nd, and Dy can be added in order to further improve the resistance against the high temperature oxidation.

Fe is a basic element of any one of the aforementioned alloy systems and occupies the balanced content.

The aforementioned alloy systems can be fabricated by an ordinary casting technique. The casts can be further subjected to the hot or cold forming process or pulverized, depending on the desired final shape of the applications.

EMBODIMENTS

Embodiment 1

In order to prove the predicted effect of the present invention, various alloy systems according to the present invention were fabricated with chemical compositions as listed in Table 1. The coefficient of thermal expansion from room temperature up to 1,273K and weight gain due to a high temperature oxidation, and increments in specific resistance were measured for all these alloys. All data obtained are listed and compared to those obtained from the conventional types of alloys, as seen in Table 2. Data with * marks for the conventional materials indicate that these alloys are disclosed in the Japan Patent Application Laid-Open No. Tokkai Hei 8-277441 (1996).

The weight gain due to the high temperature oxidation was obtained from the weight differences between before and after divided by the total exposed area. The high temperature oxidation was carried out in the air at 1,273K for 1,000 hours.

The increments in the specific resistance was obtained by increments in resistance multiplied by the total surface area of sample after being exposed to the air at 1,273K for 490 hours. Since the oxide film on the specimen has little thickness, the total surface area will be the most important factor governing increments in the specific resistance. If the measured resistance is R, R must be, therefore inversely proportional to the surface area. Namely, R 1/S, where S is surface area. If the proportional constant to this equation is $\rho$, then we have $R=\rho \times (1/S)$, $\rho = R \cdot S$. Hence, $\rho$ has a unit of $m\Omega \cdot cm^2$.

From Tables 1 and 2, the low thermal expansion alloys according to the present invention exhibit close values of coefficient of thermal expansion ($10 \sim 12 \times 10^{-6}/K$) of stabilized zirconia. Moreover, it was found that the alloy systems of the present invention demonstrated their superior properties of electrical conductivity and oxidation resistance to the conventional types of alloys.

TABLE 1

Cf. Inv.:This Invention, Com.:Comparison

| Sam. | | chemical composition(wt %, bal-Fe) | | | | | | | | |
|---|---|---|---|---|---|---|---|---|---|---|
| | No. | Cr | W | Y | Hf | Ce | La | Nd | Dy | B | Al |
| Inv. | 1 | 15.2 | 13.3 | — | — | — | — | — | — | — | 0.32 |
| | 2 | 24.5 | 9.1 | — | — | — | — | — | — | — | 0.60 |
| | 3 | 30.7 | 7.7 | — | — | — | — | — | — | 0.004 | 0.88 |
| | 4 | 37.4 | 5.1 | — | — | — | — | — | — | 0.008 | 0.13 |
| | 5 | 16.8 | 7.0 | — | — | — | — | — | 0.11 | — | 0.43 |
| | 6 | 39.9 | 6.1 | — | 0.09 | — | — | — | — | 0.007 | 0.27 |
| | 7 | 17.7 | 14.8 | — | — | — | — | 0.28 | 0.04 | — | 0.56 |
| | 8 | 23.8 | 5.2 | — | — | — | 0.40 | — | — | — | 0.22 |
| | 9 | 15.4 | 8.3 | — | — | — | — | 0.15 | — | 0.002 | 0.34 |
| | 10 | 17.5 | 9.5 | — | — | 0.019 | 0.010 | — | — | — | 0.11 |
| | 11 | 33.8 | 7.7 | 0.91 | — | — | — | — | — | 0.006 | 0.67 |
| | 12 | 18.3 | 5.6 | — | — | 0.007 | 0.003 | — | — | — | 0.97 |
| | 13 | 20.2 | 6.9 | — | — | 0.161 | 0.073 | — | — | — | 0.55 |
| Com. | 14 | 17.6 | 7.1 | — | 0.08 | — | — | — | — | 0.003 | — |
| | 15 | 17.5 | 14.9 | — | — | — | 0.32 | — | — | 0.009 | — |
| | 16 | 15.1 | 8.0 | — | — | — | — | 0.16 | — | — | — |
| | 17 | 24.2 | 5.1 | — | — | — | — | 0.30 | 0.05 | 0.005 | — |
| | 18 | 39.7 | 6.5 | — | — | — | — | — | 0.12 | — | — |
| | 19 | 10.3 | 6.9 | — | — | — | — | — | — | — | 0.05 |
| | 20 | 13.5 | 16.1 | — | — | — | 0.17 | — | — | — | — |
| | 21 | 17.8 | 9.8 | 0.95 | — | — | — | — | — | — | — |
| | 22 | 18.0 | 5.2 | — | — | 0.155 | 0.065 | — | — | — | — |
| | 23 | 20.0 | 6.8 | — | — | 0.008 | 0.002 | — | — | — | — |
| | 24 | 34.5 | 7.4 | — | — | 0.018 | 0.005 | — | — | — | — |
| | 25 | 17.3 | — | — | — | — | — | — | — | — | — |
| | 26 | 5.1 | 6.8 | — | — | — | — | — | — | — | — |
| | 27 | 44.8 | 7.2 | — | — | — | — | — | — | — | — |
| | 28 | 17.9 | 9.0 | — | — | — | — | — | — | — | 1.44 |

TABLE 2

Cf. Inv.:This Invention, Com.:Comparison

|  | Sam. No. | coefficient of thermal expansion (R.T. ~ 1273 K) | weight gain due to the high temperature oxidation (mg/cm$^2$) | the increments in the specific resistance (mΩ · cm$^2$) | the presence of the dispersed Al$_2$O$_3$ oxides (with or without) | remarks |
|---|---|---|---|---|---|---|
| Inv. | 1 | 12.8 × 10$^{-6}$/K | 3.0 | 7 | with |  |
|  | 2 | 12.5 × 10$^{-6}$/K | 2.8 | 8 | with |  |
|  | 3 | 12.7 × 10$^{-6}$/K | 2.8 | 9 | with |  |
|  | 4 | 12.7 × 10$^{-6}$/K | 2.7 | 6 | with |  |
|  | 5 | 12.3 × 10$^{-6}$/K | 1.2 | 4 | with |  |
|  | 6 | 12.9 × 10$^{-6}$/K | 2.7 | 6 | with |  |
|  | 7 | 12.9 × 10$^{-6}$/K | 2.1 | 5 | with |  |
|  | 8 | 12.8 × 10$^{-6}$/K | 2.7 | 7 | with |  |
|  | 9 | 12.4 × 10$^{-6}$/K | 2.4 | 5 | with |  |
|  | 10 | 12.5 × 10$^{-6}$/K | 3.0 | 9 | with |  |
|  | 11 | 12.6 × 10$^{-6}$/K | 1.5 | 4 | with |  |
|  | 12 | 12.7 × 10$^{-6}$/K | 0.9 | 3 | with |  |
|  | 13 | 12.6 × 10$^{-6}$/K | 1.5 | 4 | with |  |
| Com. | 14 | 12.1 × 10$^{-6}$/K | 1.3 | 13 | without | * |
|  | 15 | 12.9 × 10$^{-6}$/K | 1.9 | 16 | without | * |
|  | 16 | 12.2 × 10$^{-6}$/K | 2.5 | 20 | without | * |
|  | 17 | 12.7 × 10$^{-6}$/K | 2.3 | 18 | without | * |
|  | 18 | 12.9 × 10$^{-6}$/K | 2.8 | 19 | without | * |
|  | 19 | 13.3 × 10$^{-6}$/K | 26.4 | 530 | without |  |
|  | 20 | 13.5 × 10$^{-6}$/K | 6.4 | 180 | without |  |
|  | 21 | 12.8 × 10$^{-6}$/K | 3.0 | 21 | without | * |
|  | 22 | 12.4 × 10$^{-6}$/K | 0.8 | 10 | without | * |
|  | 23 | 12.4 × 10$^{-6}$/K | 1.1 | 11 | without | * |
|  | 24 | 12.5 × 10$^{-6}$/K | 1.6 | 17 | without | * |
|  | 25 | 13.8 × 10$^{-6}$/K | 22.6 | 510 | without | SUS430 |
|  | 26 | 13.6 × 10$^{-6}$/K | 30.3 | 640 | without |  |
|  | 27 | 13.2 × 10$^{-6}$/K | 5.2 | 120 | without |  |
|  | 28 | 13.5 × 10$^{-6}$/K | 0.6 | 380 | with |  |

Embodiment 2

Various types of Cr—W—Co—Fe system alloys according to the present invention were prepared as listed in Table 3. Experimental results on 0.2% yield strength at 1,273K, the coefficient of thermal expansion from room temperature to 1,273K, weight gain due to the high temperature oxidation and the specific resistance are listed and compared with those obtained from the conventional types of alloys, as seen in Table 4.

The 0.2% yield strength test at 1,273K was conducted with the high temperature tensile testing machine, which is based on the JIS G0567 (JIS: Japanese Industrial Standard) Specification "High Temperature Test Method for Iron Steels and Heat Resisting Alloys". The tests were conducted under the strain rate of 0.6%/min. Experimental conditions for the high temperature weight changes due to oxidation and the specific resistance measurements were same as those used for the tests for Embodiment 1.

From Tables 3 and 4, it was found that Cr—W—Co—Fe system alloys according to the present invention showed superior high temperature mechanical properties and close values of coefficient of thermal expansion (10~12×10$^{-6}$/K) of stabilized zirconia. It was also evaluated that the present alloys exhibit superior properties of electrical conductivity and oxidation resistance to the conventional types of alloys.

TABLE 3

Cf. Inv.:This Invention, Com.:Comparison

|  | Sam. No. | chemical composition(wt %, bal-Fe) | | | | | | | | | | |
|---|---|---|---|---|---|---|---|---|---|---|---|---|
|  |  | Cr | W | Co | Al | Y | Hf | Ce | La | Nd | Dy | B |
| Inv. | 31 | 15.1 | 5.2 | 9.9 | 0.11 | — | — | — | — | 0.21 | — | 0.002 |
|  | 32 | 38.2 | 6.1 | 1.2 | 0.13 | — | — | — | — | — | 0.15 | — |
|  | 33 | 16.9 | 14.2 | 7.3 | 0.26 | — | — | — | 0.39 | — | — | 0.006 |
|  | 34 | 24.1 | 6.3 | 3.4 | 0.64 | — | — | 0.20 | — | — | — | — |
|  | 35 | 15.8 | 9.7 | 8.5 | 0.34 | — | 0.12 | — | — | — | — | 0.008 |
|  | 36 | 18.4 | 9.0 | 5.1 | 0.52 | — | — | 0.063 | 0.037 | — | — | 0.003 |
|  | 37 | 30.3 | 7.5 | 2.3 | 0.41 | 0.89 | — | — | — | — | — | — |
|  | 38 | 17.9 | 10.4 | 6.7 | 0.98 | — | — | — | — | — | — | 0.010 |
|  | 39 | 21.5 | 8.0 | 4.6 | — | — | — | — | — | — | — | — |
|  | 40 | 18.1 | 9.3 | 5.8 | 0.18 | — | — | — | — | — | — | — |

TABLE 3-continued

Cf. Inv.:This Invention, Com.:Comparison

| | Sam. No. | \multicolumn{11}{c}{chemical composition(wt %, bal-Fe)} | | | | | | | | | |
|---|---|---|---|---|---|---|---|---|---|---|---|
| | | Cr | W | Co | Al | Y | Hf | Ce | La | Nd | Dy | B |
| | 41 | 19.5 | 7.0 | 2.9 | — | — | — | — | — | — | — | — |
| | 42 | 18.3 | 9.2 | 5.3 | — | — | — | 0.012 | 0.007 | — | — | — |
| | 43 | 37.7 | 5.6 | 3.4 | — | — | — | — | — | 0.015 | — | — |
| | 44 | 24.8 | 12.4 | 9.8 | — | 0.55 | — | — | — | — | — | — |
| | 45 | 18.2 | 7.5 | 5.4 | — | — | — | — | — | — | — | 0.005 |
| | 46 | 26.5 | 11.1 | 8.3 | — | — | — | — | — | — | — | 0.004 |
| Com. | 47 | 17.8 | 9.8 | — | 0.54 | — | — | — | — | — | — | — |
| | 48 | 18.3 | 7.3 | — | — | — | — | — | — | — | — | — |
| | 49 | 15.6 | 14.8 | — | — | — | — | — | — | — | — | — |
| | 50 | 17.0 | 22.0 | — | — | — | — | — | — | — | — | — |
| | 51 | 25.4 | 7.8 | — | — | — | — | 0.020 | 0.008 | — | — | — |
| | 52 | 17.8 | 9.1 | — | 2.01 | — | — | — | — | — | — | — |
| | 53 | 17.1 | — | — | — | — | — | — | — | — | — | — |
| | 54 | 24.3 | 5.8 | — | — | — | — | — | — | 0.31 | 0.12 | 0.009 |
| | 55 | 20.6 | 8.9 | — | — | — | 0.08 | — | — | — | — | 0.005 |
| | 56 | 39.5 | 5.3 | — | — | 0.68 | — | — | — | — | — | — |
| | 57 | 32.1 | 7.4 | — | — | — | — | — | — | — | — | 0.007 |

TABLE 4

Cf. Inv.:This Invention, Com.:Comparison

| | Sam. No. | 0.2% yield strength (kgf/mm$^2$) | coefficient of thermal expansion (R.T. ~ 1273 K) | weight gain due to the high temperature oxidation (mg/cm$^2$) | the increments in the specific resistance (mΩ · cm$^2$) |
|---|---|---|---|---|---|
| Inv. | 31 | 3.1 | 12.9 × 10$^{-6}$/K | 1.3 | 9 |
| | 32 | 2.7 | 12.3 × 10$^{-6}$/K | 2.6 | 8 |
| | 33 | 2.7 | 12.8 × 10$^{-6}$/K | 1.9 | 7 |
| | 34 | 2.9 | 12.5 × 10$^{-6}$/K | 2.8 | 4 |
| | 35 | 2.9 | 12.5 × 10$^{-6}$/K | 2.3 | 5 |
| | 36 | 2.8 | 12.2 × 10$^{-6}$/K | 0.8 | 3 |
| | 37 | 2.8 | 12.7 × 10$^{-6}$/K | 1.5 | 4 |
| | 38 | 2.7 | 12.6 × 10$^{-6}$/K | 3.0 | 9 |
| | 39 | 3.2 | 12.3 × 10$^{-6}$/K | 2.3 | 18 |
| | 40 | 3.0 | 12.4 × 10$^{-6}$/K | 1.7 | 9 |
| | 41 | 2.8 | 12.6 × 10$^{-6}$/K | 2.6 | 21 |
| | 42 | 2.8 | 12.5 × 10$^{-6}$/K | 1.6 | 13 |
| | 43 | 2.6 | 12.7 × 10$^{-6}$/K | 2.1 | 19 |
| | 44 | 3.1 | 12.8 × 10$^{-6}$/K | 2.2 | 17 |
| | 45 | 3.0 | 12.5 × 10$^{-6}$/K | 3.0 | 19 |
| | 46 | 3.1 | 12.7 × 10$^{-6}$/K | 2.8 | 20 |
| Com. | 47 | 1.7 | 12.5 × 10$^{-6}$/K | 3.3 | 25 |
| | 48 | 1.2 | 12.6 × 10$^{-6}$/K | 4.9 | 19 |
| | 49 | 1.3 | 12.9 × 10$^{-6}$/K | 5.2 | 32 |
| | 50 | 1.5 | 13.5 × 10$^{-6}$/K | 11.1 | 78 |
| | 51 | 1.9 | 12.5 × 10$^{-6}$/K | 1.8 | 16 |
| | 52 | 1.1 | 13.2 × 10$^{-6}$/K | 1.0 | 400 |
| | 53 | 1.0 | 13.8 × 10$^{-6}$/K | 22.7 | 530 |
| | 54 | 1.2 | 12.8 × 10$^{-6}$/K | 2.5 | 18 |
| | 55 | 1.4 | 12.4 × 10$^{-6}$/K | 1.3 | 15 |
| | 56 | 1.6 | 12.9 × 10$^{-6}$/K | 2.8 | 23 |
| | 57 | 1.3 | 12.8 × 10$^{-6}$/K | 10.7 | 20 |

Embodiment 3

Various Cr—W—(Ti,Zr,Hf)—Fe system alloys according to the present invention were fabricated with respective chemical compositions, as listed in Table 5. The 0.2% yield strength at 1,273K, the coefficient of thermal expansion from room temperature to 1,273K, the weight gain and specific resistance at the high temperature were measured and compared to results obtained from the conventional types of alloys, as seen in Table 6.

From Tables 5 and 6, it is clearly found that Cr—W—(Ti,Zr,Hf)—Fe system alloys of the present invention demonstrated superior high temperature mechanical properties and specific resistance to the conventional type of alloys. They also exhibit close values of coefficient of thermal expansion (10~12×10$^{-6}$/K) of stabilized zirconia. Moreover, they also show a superiority of electrical conductivity and resistance against the high temperature oxidation to the conventional types of alloys.

TABLE 5

Cf. Inv.:This Invention, Com.:Comparison

| | Sam. No. | \multicolumn{13}{c|}{chemical composition(wt %, bal-Fe)} |
|---|---|---|---|---|---|---|---|---|---|---|---|---|---|---|

| | Sam. No. | Cr | W | Co | Ti | Zr | Hf | Al | Y | Ce | La | Nd | Dy | B |
|---|---|---|---|---|---|---|---|---|---|---|---|---|---|---|
| Inv. | 61 | 17.7 | 13.6 | — | 0.17 | 0.35 | — | — | — | — | — | — | — | — |
| | 62 | 20.8 | 5.4 | — | 1.8 | — | 0.21 | 0.32 | — | — | — | — | — | — |
| | 63 | 25.3 | 11.8 | 9.5 | — | 0.13 | — | — | — | — | — | 0.11 | — | — |
| | 64 | 17.8 | 9.0 | 5.8 | 4.9 | — | — | — | — | — | — | — | 0.08 | — |
| | 65 | 18.0 | 8.9 | 6.1 | — | 0.68 | — | 0.51 | — | — | — | — | — | — |
| | 66 | 20.4 | 6.2 | — | 0.42 | 2.7 | 0.36 | — | — | — | — | — | — | 0.002 |
| | 67 | 32.1 | 7.1 | — | 1.1 | 1.4 | 2.2 | 0.28 | — | — | — | — | — | 0.007 |
| | 68 | 19.5 | 14.3 | 5.0 | — | — | 2.8 | — | — | — | — | — | — | 0.008 |
| | 69 | 18.8 | 9.1 | 5.8 | — | 1.0 | — | 0.97 | — | — | — | — | — | 0.004 |
| | 70 | 23.6 | 6.7 | 2.9 | — | 4.6 | — | 0.66 | 0.92 | — | — | — | — | — |
| | 71 | 39.8 | 7.4 | 1.1 | 1.3 | — | 0.21 | 0.14 | — | — | — | — | — | — |
| | 72 | 16.2 | 5.1 | 9.2 | — | 3.4 | — | 0.17 | — | 0.072 | 0.033 | — | — | 0.003 |
| | 73 | 15.7 | 14.7 | 7.4 | — | — | 1.7 | 0.69 | — | 0.28 | — | — | — | 0.005 |
| | 74 | 16.0 | 9.5 | 8.0 | — | — | 4.3 | 0.36 | — | — | — | — | — | 0.010 |
| | 75 | 29.9 | 7.6 | 2.5 | 0.32 | 1.8 | — | 0.45 | — | — | 0.31 | — | — | — |
| | 76 | 22.2 | 8.2 | 4.5 | 0.80 | 1.1 | 1.2 | 0.11 | — | — | — | — | — | 0.009 |
| | 77 | 20.1 | 6.9 | 3.2 | 2.5 | — | — | — | — | — | — | — | — | — |
| | 78 | 32.4 | 5.8 | 4.1 | 0.60 | 2.1 | 1.2 | — | — | — | — | — | — | 0.006 |
| | 79 | 15.2 | 10.3 | — | 1.2 | 0.52 | — | — | 0.24 | — | — | 0.01 | — | — |
| | 80 | 34.5 | 6.4 | — | — | 0.29 | 0.84 | 0.47 | — | 0.06 | — | — | 0.03 | — |
| | 81 | 18.4 | 7.8 | — | 2.1 | — | 2.4 | — | — | — | 0.05 | 0.08 | — | 0.002 |
| | 82 | 27.5 | 5.2 | — | 0.04 | 0.08 | 0.16 | 0.56 | 0.31 | 0.10 | 0.14 | — | — | 0.008 |
| Com. | 83 | 15.8 | 9.7 | 8.5 | — | — | 0.12 | 0.34 | — | — | — | — | — | 0.008 |
| | 84 | 18.4 | 9.0 | 5.1 | — | — | — | 0.52 | — | 0.63 | 0.037 | — | — | 0.003 |
| | 85 | 30.3 | 7.5 | 2.3 | — | — | — | 0.41 | 0.89 | — | — | — | — | — |
| | 86 | 37.7 | 5.6 | 3.4 | — | — | — | — | — | — | — | 0.015 | — | — |
| | 87 | 17.8 | 9.8 | — | — | — | — | 0.54 | — | — | — | — | — | — |
| | 88 | 17.8 | 9.1 | — | — | — | — | 2.01 | — | — | — | — | — | — |
| | 89 | 17.1 | — | — | — | — | — | — | — | — | — | — | — | — |
| | 90 | 35.5 | 7.3 | — | — | — | — | — | — | — | — | — | — | — |
| | 91 | 24.3 | 11.5 | — | — | — | — | — | — | — | — | — | — | 0.007 |
| | 92 | 16.2 | 5.5 | — | — | — | — | — | — | — | — | 0.22 | 0.13 | — |
| | 93 | 19.3 | 14.8 | — | — | — | — | — | — | — | — | — | 0.56 | 0.004 |

TABLE 6

Cf. Inv.:This Invention, Com.:Comparison

| | Sam. No. | 0.2% yield strength (kgf/mm$^2$) (at 1273 K) | coefficient of thermal expansion (1/K) (R.T. ~ 1273 K) | weight gain due to the high temperature oxidation (mg/cm$^2$) | the increment in the specific resistance (mΩ · cm$^2$) | specific resistance (mΩ · cm$^2$) |
|---|---|---|---|---|---|---|
| Inv. | 61 | 1.5 | 12.3 × 10$^{-6}$/K | 1.5 | 6 | 21 |
| | 62 | 1.2 | 12.4 × 10$^{-6}$/K | 0.8 | 7 | 18 |
| | 63 | 3.2 | 12.8 × 10$^{-6}$/K | 2.3 | 9 | 25 |
| | 64 | 2.7 | 12.5 × 10$^{-6}$/K | 0.8 | 5 | 17 |
| | 65 | 3.1 | 12.4 × 10$^{-6}$/K | 2.2 | 8 | 22 |
| | 66 | 1.4 | 12.5 × 10$^{-6}$/K | 1.8 | 7 | 15 |
| | 67 | 1.3 | 12.8 × 10$^{-6}$/K | 1.0 | 8 | 14 |
| | 68 | 2.6 | 12.6 × 10$^{-6}$/K | 1.9 | 6 | 17 |
| | 69 | 2.9 | 12.2 × 10$^{-6}$/K | 2.1 | 7 | 18 |
| | 70 | 2.8 | 12.5 × 10$^{-6}$/K | 1.5 | 4 | 21 |
| | 71 | 2.8 | 12.3 × 10$^{-6}$/K | 1.1 | 3 | 17 |
| | 72 | 3.0 | 12.9 × 10$^{-6}$/K | 0.7 | 2 | 16 |
| | 73 | 2.8 | 12.8 × 10$^{-6}$/K | 1.2 | 3 | 15 |
| | 74 | 2.8 | 12.5 × 10$^{-6}$/K | 0.7 | 4 | 20 |
| | 75 | 2.9 | 12.7 × 10$^{-6}$/K | 0.8 | 4 | 15 |
| | 76 | 3.1 | 12.3 × 10$^{-6}$/K | 1.7 | 9 | 17 |
| | 77 | 2.9 | 12.6 × 10$^{-6}$/K | 1.3 | 9 | 16 |
| | 78 | 2.5 | 12.7 × 10$^{-6}$/K | 0.9 | 5 | 15 |
| | 79 | 1.9 | 12.4 × 10$^{-6}$/K | 0.9 | 4 | 14 |
| | 80 | 1.6 | 12.6 × 10$^{-6}$/K | 0.7 | 2 | 11 |
| | 81 | 1.8 | 12.5 × 10$^{-6}$/K | 0.8 | 3 | 13 |
| | 82 | 1.6 | 12.5 × 10$^{-6}$/K | 0.7 | 4 | 12 |

TABLE 6-continued

Cf. Inv.:This Invention, Com.:Comparison

| | Sam. No. | 0.2% yield strength (kgf/mm$^2$) (at 1273 K) | coefficient of thermal expansion (1/K) (R.T. ~ 1273 K) | weight gain due to the high temperature oxidation (mg/cm$^2$) | the increment in the specific resistance (mΩ · cm$^2$) | specific resistance (mΩ · cm$^2$) |
|---|---|---|---|---|---|---|
| Com. | 83 | 2.9 | 12.5 × 10$^{-6}$/K | 2.3 | 5 | 46 |
| | 84 | 2.8 | 12.2 × 10$^{-6}$/K | 0.8 | 3 | 42 |
| | 85 | 2.8 | 12.7 × 10$^{-6}$/K | 1.5 | 4 | 57 |
| | 86 | 2.6 | 12.7 × 10$^{-6}$/K | 2.1 | 19 | 62 |
| | 87 | 1.7 | 12.5 × 10$^{-6}$/K | 3.3 | 25 | 58 |
| | 88 | 1.1 | 13.2 × 10$^{-6}$/K | 1.0 | 400 | 70 |
| | 89 | 1.0 | 13.8 × 10$^{-6}$/K | 22.7 | 530 | 65 |
| | 90 | 1.5 | 12.9 × 10$^{-6}$/K | 18.9 | 280 | 61 |
| | 91 | 1.8 | 12.8 × 10$^{-6}$/K | 20.6 | 310 | 63 |
| | 92 | 1.3 | 12.5 × 10$^{-6}$/K | 2.9 | 23 | 52 |
| | 93 | 1.4 | 12.6 × 10$^{-6}$/K | 2.4 | 21 | 54 |

INDUSTRIAL APPLICABILITY

Since it was found that various types of Cr—W—Fe system alloys according to the present invention exhibit close values of coefficient of thermal expansion (10~12× 10$^{-6}$/K) of stabilized zirconia, excellent high temperature mechanical properties, superior electrical conductivity and oxidation resistance to the conventional types of alloys, the present alloys can be used as an intermediate layer between the substrate material and the thermal barrier coating of stabilized zirconia system ceramic, a separator of solid oxide fuel cell in which stabilized zirconia is employed as an electrolyte, or the like. Furthermore, the present alloys can be co-used with any materials whose coefficient of thermal expansion are close to those of stabilized zirconia.

Since the oxidation resisting low thermal expansion alloys of the present invention such as Cr—W—Al—Fe system, Cr—W—Al—B—Fe system, Cr—W—Al—M—Fe system and Cr—W—Al—B—M—Fe system alloys can be prepared by an appropriate controlling of adding amounts of Cr and Al elements, a surface oxide layer comprising of Cr$_2$O$_3$ containing Al$_2$O$_3$ and internally dispersed Al$_2$O$_3$ can be formed. Because of these surface oxide and internal oxide formation, the present alloys exhibit closer values of coefficient of thermal expansion to those of stabilized zirconia than conventional stainless steels, resulting in providing a better thermal matching. It is also found that the present alloys show excellent electrical conductivity. Hence, these newly developed alloys are good oxidation resisting materials which can be used in various applications.

The specific resistance (which can be obtained by the increments in resistance after treatments in the air at 1,273K for 490 hours multiplied with the total surface area) of the various alloys from the Cr—W—Al—Fe system according to the present invention show an equal to or less value than those obtained from conventional types of alloys. These alloys exhibit excellent high temperature electrical conductivity.

Alloys from Cr—W—Co—Fe system, Cr—W—Co—Al—Fe system, Cr—W—Co—B—Fe system, and Cr—W—Co—Al—B—Fe system show close values of coefficient of thermal expansion of stabilized zirconia and more than 2.0 kgf/mm$^2$ of 0.2% yield strength at 1,273K, indicating that the present alloys exhibit excellent high temperature mechanical properties, the oxidation resistance, and the electrical conductivity.

Alloys from Cr—W—(Ti,Zr,Hf)—Fe system, Cr—W—(Ti,Zr,Hf)—B—Fe system, Cr—W—(Ti,Zr,Hf)—M—Fe system, Cr—W—(Ti,Zr,Hf)—B—M—Fe system, Cr—W—(Ti,Zr,Hf)—Al—Fe system, Cr—W—(Ti—Zr,Hf)—Al—B—Fe system, Cr—W—(Ti,Zr,Hf)—Al—M—Fe system, Cr—W—(Ti,Zr,Hf)—Al—B—M—Fe system, Cr—W—(Ti—Zr,Hf)—Co—Fe system, Cr—W—(Ti,Zr,Hf)—Co—B—Fe system, Cr—W—(Ti,Zr,Hf)—Co—M—Fe system, Cr—W—(Ti,Zr,Hf)—Co—B—M—Fe system, Cr—W—(Ti,Zr,Hf)—Al—Co—Fe system, Cr—W—(Ti,Zr,Hf)—Al—Co—B—Fe system, Cr—W—(Ti—Zr,Hf)—Al—Co—M—Fe system and Cr—W—(Ti,Zr,Hf)—Al—Co—B—M—Fe system according to the present invention show close values of coefficient of thermal expansion of stabilized zirconia and exhibit excellent high temperature mechanical properties, the oxidation resistance, and the electrical conductivity.

As a result, these alloy systems of the present invention can promise a prolonging the lives of various types of plant machinery being operated at elevated temperatures including gas turbine and a scaling-up of solid oxide fuel cell. Furthermore, since these materials are metallic materials, the present materials (metallic alloys) are much easily machined than oxides, so that the productivity and low cost-performance of solid oxide fuel cell can be realized.

While this invention has been described in detail with respect to preferred embodiment and examples, it should be understood that the invention is not limited to that precise embodiments; rather many modifications, and variations would present themselves to those of skill in the art without departing from the scope and spirit of this invention, as defined in the appended claims.

What is claimed is:

1. A low thermal expansion alloy comprising Cr—W—Fe based alloy selected from the groups consisting of Cr—W—Al—Fe, Cr—W—Al—B—Fe, Cr—W—Al—M—Fe, Cr—W—Al—B—M—Fe, Cr—W—Co—Fe, Cr—W—Co—B—Fe, Cr—W—Co—M—Fe, Cr—W—Co—B—M—Fe, Cr—W—Co—Al—Fe, Cr—W—Co—Al—B—Fe, Cr—W—Co—Al—M—Fe, Cr—W—Co—Al—B—M—Fe, Cr—W—(Ti, Zr, Hf)—Fe, Cr—W—(Ti, Zr, Hf)—B—Fe, Cr—W—(Ti, Zr, Hf)—M—Fe, Cr—W—(Ti, Zr, Hf)—B—M—Fe, Cr—W—(Ti, Zr, Hf)—Al—Fe, Cr—W—(Ti, Zr, Hf)—Al—B—Fe, Cr—W—(Ti, Zr, Hf)—Al—M—Fe, Cr—W—(Ti, Zr, Hf)—Al—B—M—Fe, Cr—W—(Ti, Zr, Hf)—Co—Fe, Cr—W—(Ti, Zr, Hf)—Co—B—Fe, Cr—W—(Ti, Zr, Hf)—Co—M—Fe, Cr—W—(Ti, Zr, Hf)—Co—B—M—Fe, Cr—W—(Ti, Zr, Hf)—Al—Co—Fe, Cr—W—(Ti, Zr, Hf)—Al—Co—B—Fe, Cr—W—(Ti, Zr, Hf)—Al—Co—M—Fe and Cr—W—(Ti, Zr, Hf)—Al—Co—B—M—Fe,
the low thermal expansion alloy having limitations for each alloying element comprising 15–40 wt % of Cr, 5–15 wt % of W, 0.1–1 wt % of Al, 1–10 wt % of Co, 0.1–5 wt % of at least one element selected from Ti, Zr and Hf, 0.001–0.01 wt % of B, 0.01–1 wt % of M which is at least one element selected from Y, Hf, Ce, La, Nd and Dy and the balance being Fe and unavoidable impurities, wherein when Hf among Ti, Zr and Hf is solely used, the alloy can contain 1 to 5 wt % of Hf and only when at least one element out of Ti and Zr is used, Hf can be selected as M.

2. A low thermal expansion alloy according to claim 1, wherein an average thermal expansion coefficient at a temperature of from room temperature to 1000° C. is more than $12 \times 10^6/K$ but less than $13 \times 10^6/K$.

3. A low thermal expansion alloy according to claim 1, wherein when containing Co, 0.25 yield strength of the alloy at a temperature of 1000° C. is more than 2.0 kgf/mm$^2$.

4. A low thermal expansion alloy according to claim 1, wherein when containing Al, the alloy is provided on its surface with an oxide layer composed of $Cr_2O_3$ containing $Al_2O_3$ and in the inside with a dispersion layer of $Al_2O_3$.

5. A low thermal expansion alloy according to claim 1, wherein a specific resistance of the alloy is less than 10 m$\Omega/cm^2$, the specific resistance of which is expressed by a value resulting from multiplication of an increment of the resistance obtained after a heat-treatment at 1000° C. for 1000 hours in atmosphere by the surface area of an alloy species.

* * * * *

UNITED STATES PATENT AND TRADEMARK OFFICE
CERTIFICATE OF CORRECTION

PATENT NO.    : 6,123,898
DATED         : Sepetmber 26, 2000
INVENTOR(S)   : Hitoshi TAIMATSU et al.

It is certified that error appears in the above-identified patent and that said Letters Patent are hereby corrected as shown below:

In claim 3, line 2, change "0.25" to --0.2--.

Signed and Sealed this

Fifteenth Day of May, 2001

*Attest:*

NICHOLAS P. GODICI

*Attesting Officer*        *Acting Director of the United States Patent and Trademark Office*